United States Patent [19]

Hersh et al.

[11] Patent Number: 5,685,706
[45] Date of Patent: Nov. 11, 1997

[54] V-JET ATOMIZER

[75] Inventors: Stuart Hersh, New City, N.Y.; Dan V. Giovanni, Berkeley; Stephen E. Kerho, Mission Viejo, both of Calif.; Anthony V. Conti, Patterson, N.Y.

[73] Assignee: Electric Power Research Institute, Palo Alto, Calif.

[21] Appl. No.: 519,701

[22] Filed: Aug. 28, 1995

Related U.S. Application Data

[63] Continuation of Ser. No. 120,826, Sep. 15, 1993, abandoned.

[51] Int. Cl.⁶ ........................................ F23C 5/00
[52] U.S. Cl. ........................................ 431/8; 431/354
[58] Field of Search ..................... 431/8, 354, 10, 431/181, 350, 187; 239/460, 567, 568, 552, 8

[56] References Cited

U.S. PATENT DOCUMENTS

| | | | |
|---|---|---|---|
| 1,320,004 | 10/1919 | Helps | 239/460 X |
| 1,779,680 | 10/1930 | Laydield | 239/460 X |
| 1,799,459 | 4/1931 | Farutz | 431/187 X |
| 1,874,002 | 8/1932 | Fantz . | |
| 1,960,685 | 5/1934 | Thompson et al. | 431/187 X |
| 1,967,036 | 7/1934 | Lithgow | 239/552 |
| 2,049,150 | 7/1936 | Bencowitz et al. | 431/207 |
| 2,215,079 | 9/1940 | Hess | 431/348 |
| 2,442,465 | 6/1948 | Long et al. | 431/207 |
| 2,543,617 | 2/1951 | Wiaret . | |
| 2,914,257 | 11/1959 | Wiant . | |
| 2,980,171 | 4/1961 | Furczyk et al. | 431/348 |

(List continued on next page.)

FOREIGN PATENT DOCUMENTS

| | | | |
|---|---|---|---|
| 0 314 354 | 5/1989 | European Pat. Off. . | |
| 0 419 198 | 3/1991 | European Pat. Off. . | |
| 1026109 | 4/1953 | France | 239/567 |
| 2 500 331 | 8/1982 | France . | |
| 0123737 | 9/1979 | Japan | 431/10 |
| 227698 | 9/1943 | Switzerland | 239/568 |
| 1408136 | 10/1975 | United Kingdom | 431/187 |
| 2 186 507 | 8/1987 | United Kingdom . | |

OTHER PUBLICATIONS

Patent Abstract of Japan, Publication No. JP 61049908, Mar. 12, 1986.

Miller, Michael J., "Retrofit sO2 and Nox Control Technologies for Coal–Fired Power Plants", For Presentation at the 78th Annual Meeting of the Air Pollution Control Association, Jun. 16–21, 1985, Detroit Michigan.

(List continued on next page.)

Primary Examiner—Carl D. Price
Attorney, Agent, or Firm—Nikaido, Marmelstein, Murray & Oram LLP

[57] ABSTRACT

A fluid atomizer and spraying means which is made up of: a mixing chamber into which the fluid to be atomized and the atomizing gas are introduced and in which the fluid is admixed with and dispersed in the gas; a generally conical nozzle means extending from the mixing chamber through which the mixed fluid and gas are forced; and a chamber into which the atomized mixed fluid and gas is sprayed. The conical nozzle means is suitably a relatively narrow frustro-conical passageway which contains support-spacer means which is generally parallel to the direction of flow through the passageway. At least one such support-spacer means is provided which extends from the end of the passageway proximate to the mixing chamber to the end of the passageway proximate to the chamber into which the mixture is sprayed. The preferred use of this apparatus is in atomizing fuel oil with steam and spraying such atomized mixture into a combustion chamber where it is contacted with combustion air. The amount of effluent NOX is reduced and limited by the use of this configuration by creating alternating fuel-rich and air-rich spatial distribution, and allowing the amount of stoichiometric excess air to be severely limited, while causing the substantially complete combustion of the fuel oil.

18 Claims, 4 Drawing Sheets

U.S. PATENT DOCUMENTS

| | | | |
|---|---|---|---|
| 3,139,138 | 6/1964 | Bloom | 431/239 |
| 4,087,050 | 5/1978 | Tsaiji et al. | 239/568 X |
| 4,195,779 | 4/1980 | Auclair et al. | |
| 4,383,649 | 5/1983 | Reed et al. | 239/567 X |
| 4,790,480 | 12/1988 | Pennie | 239/125 |
| 4,842,509 | 6/1989 | Hasenack | 431/10 |
| 5,052,919 | 10/1991 | Becker | 431/10 |
| 5,092,760 | 3/1992 | Brown et al. | 431/10 |
| 5,215,455 | 6/1993 | Dykema | 431/10 X |

OTHER PUBLICATIONS

Mulholland, J.A., Lanier, W.S., "Application of Reburning for Nox Control to a Firetube Package Boiler", Journal of Engineering for Gas Turbines and Power, Jul. 1985, vol. 107 pp. 739–743.

Mumford, S.E., Hung, W.S.Y., "A Potential Low Nox Emission Combustor for Gas Turbines Using the Concept of Hybrid Combustion", Journal of Engineering for Power, Oct. 1977, pp. 631–637.

Pick, Randal W., "Computer Program Optimizes Turbine Backpressure", Power Engineering, Dec. 1989, pp. 50–51.

Smith, Douglas J., "Utilities Upgrade Old Power Plants With New Controls", Power Engineering, Dec. 1990, pp. 16–21.

Smoot, L. Douglas, Hill, Scott C. and Smith, Philip J., "Nox Prediction for Practical Pulverized Coal Reactors", Proceedings: 1985 Symposium on Stationary Combustion Nox Control, vol. 2, Jan. 1996, paper 6b–4.

Toof, J.L., "A Model for the Prediction of Thermal, Prompt, and Fuel Nox Emissions From Combustion Turbines", Journal of Engineering for Gas Turbines and Power, Apr. 1986, vol. 108, pp. 340–347.

Touchton, G.L., "An Experimentally Verified Nox Prediction Algorithm Incorporating the Effects of Steam Injection", Journal of Engineering for Gas Turbines and Power, Oct. 1984, vol. 106, pp. 833–840.

Urban, C.M., Dietzmann, H.E., Fanick, "Eission Control Technology for Stationary Natural Gas Engines", Journal of Engineering for Gas Turbines and Power, Jul. 1989, vol. 111, pp. 369–374.

Wade, W.R., Hunter, C.E., Trinker, F.H., Cikanek, H.A., "Reduction of Nox and Particulate Emissions in the Diesel Combustion Process", Journal of Engineering for Gas Turbines and Power, Oct. 1987, vol. 109, pp., 426–434.

Yang, Robert J., Garcia, Fernando J. and Hunter, Skillman C., "Screening and Optimization of In–Furnace–NOx–Reduction Processes for Refinery Process Heater Applications", Proceedings: 1985 Symposium on Stationary Combustion NOx Control, vol. 2, Jan. 1986, paper 4–3.

Benedek, K.R., Menzies, et al, "Emission Characteristics and Control Technology for Stationary Coal–Fueled Diesel Engines", Journal of Engineering for Gas Turbines and Power, Jul. 1989, vol. 111, pp. 507–515.

Bidini, G., Stecco, S.S., "A Computer Code Using Exergy for Optimizing Thermal Plants", Journal of Engineering for Gas Turbines and Power, Jan. 1991, vol. 113 pp. 145–150.

Boardman, R.D. and Smoot, L.D., "Predication of Fuel and Thermal No in Advanced Combustion Systems", 1989 Symposium on Stationary Combustion Nitrogen Oxide Control, vol. 2, Jul. 1989, pp. 6B1–6B20.

Chen, Shih L., Kramlich, John C., Seeker, et al, "Optimization of Reburning for Advanced Nox Control on Coal–fired Boilers", Control Technology, Oct. 1989, vol. 39, No. 10, pp. 1375–1379.

Cichanowicz, Ed, "Selective Catalytic Reduction Controls Nox in Europe", Power Engineering, Aug. 1988, pp. 36–38.

"Control Technology for Nitrogen Oxide Emissions From Stationary Sources", Organization for Economic Cooperation and Development, 1983.

EPRI Guide, Technical Reports Published 1982–1986, Jan. 1988.

Eskinazi, D. and Cichanowicz, Linak W.P. and Hall, R. E., "Stationary Combustion Control, Control Technology", Aug. 1989, vol. 39, No. 8, pp. 1131–1139.

Hess, Thomas C., "Advanced Nox and $So_2$ Emission Control Performance on a CFB", Power Engineering, Jul. 1989, pp. 47–49.

Hung, W.S.Y., "A Diffusion Limited Model That Accurately Predicts the Nox Emissions from Gas Turbine Combustors Including the Use of Nitrogen Containing Fuels", Journals of Engineering for Power, Jul. 1976, pp. 320–326.

Hung, W.S.Y., "The Nox Emissions Levels of Unconventional Fuels for Gas Turbines", Journal of Engineering for Power, Oct. 1977, pp. 575–579.

Katzberger, S.M., and Sloat. D.G., "Options are Increasing for Reducing Emissions of $SO_2$ and Nox", Power Engineering Dec. 1988, pp. 30–33.

McAlister, James, "Nomogram Calculates Combustion Emissions Form Coal Blends", Power Engineering, Jan. 1987, pp. 24–25.

Meltzer, A.R., Gallardy, P.B., "Evaluation of Acid Rain Alternatives", Power Engineering, Dec. 1990, vol's III & IV.

V-JET ATOMIZER

This application is a continuation of application Ser. No. 08/120,826, filed Sep. 15, 1993 now abandoned.

This invention is directed to the distribution of an atomized fluid in an atomizing gas and to means for spraying such. It more particularly refers to a novel dual fluid atomizer apparatus, including a novel spraying nozzle, and the use thereof.

BACKGROUND OF THE INVENTION

It is well known that there are many occasions when it is necessary or desirable to form a spray of a liquid in a gas. One such time is in the combustion of a liquid fuel with a gaseous oxidant, for example air, as the means for heating a boiler. Other uses for this type of operation are in humidification as well as in providing finely divided water droplets for cooling hot gases.

For ease of understanding, since the particular use to which this invention will be put will not substantially change the nature of this invention, this invention will be hereinafter described with particular relation to the use of the atomizer design of this invention in connection with the heating means in an oil-fired boiler. This is not to be construed as a limitation on the use to which the atomizing means of this invention may be put.

In the field of combusting liquid fuel, it has been found that it is important to effectively control the quality of the sprayed fuel in order to control the potential environmental hazards which the effluent from the combustion may create. The potential for creating effluent which is detrimental to the environment from combustion processes, particularly large oil-fired steam generators, has been exacerbated in recent years by a continued reduction in the quality of the liquid fuel being burned. This has become particularly troublesome where residual fuel is being burned.

The problem with the residual fuel which is now being fed to the burners of large steam generation facilities is that its heavier fractions have a tendency to form larger, heavier cenospheric coke particles during combustion. As the Conradson carbon number of the fuel increases, and the hydrogen to carbon ratio of the fuel decreases, as is the case with the use of residual fuel, the tendency of the fuel to be less completely combusted increases whereby the problem of coke particulate emissions is aggravated.

As bad as the situation has become over the recent past, it is reasonable to expect that it will get worse during at least the near term in the future. Thus, it is important that means be found to assist in the utilization of residual fuel to fire steam boilers whereby particulate emissions therefrom are reduced to a manageable level, and whereby more of the energy contained in the residual fuel is used.

Oil fired boilers are usually equipped with burners which are specially designed to combust oil with air to generate the heat necessary to create the desired steam. One of the principal components of the burner is the atomizer, that is, the member which atomizes the oil to allow it to be readily and efficiently combusted with the air oxidant. The atomizer produces a spray of droplets containing the oil which are then contacted with the air.

One of the detrimental effluents produced by the combustion of oil with air is NOX. The quantity of NOX which is produced is known to be a function of the flame temperature, the local fuel/air stoichiometry and the intimacy of fuel/air mixing. The nature of the oil spray substantially effects the localized fuel/air mixing through droplet dynamics (droplet inertia) and spatial spray distribution. Therefore, the intimacy of mixing of atomizing gas and oil to form the atomized spray, the intimacy of mixing the combustion air with the atomized oil droplets, and the nature of the atomization are quite influential on the NOX emissions of the burner.

The quality of the performance of the burner is often directly proportional to the performance of the atomizer. Atomizer performance is commonly measured in five (5) ways: (1) the Sauter Mean Diameter, often abbreviated SMD, of the size distribution of the atomized oil droplets; (2) the uniformity of oil mass flux around the periphery of the conically shaped spray of oil; (3) the apex angle of the spray cone; (4) the quantity of atomizing fluid, such as air, steam, or a mixture thereof, needed to produce a spray having a given, pre-specified Sauter Mean Diameter; and (5) the variation of these parameters over a specified range of oil flow rates in a given burner construction. It has been determined in the past that superior atomizer performance, in terms of these parameters: reduces carbonaceous particulate emissions, increases the caloric yield, and therefore expands the range of oils which can be used in this service.

In the past, a wide variety of atomizer designs have been used for this service. These have usually fallen into two general categories: dual fluid atomizers and mechanical atomizers. Dual fluid atomizers derive the energy, which they need to convert the liquid fuel into droplets, by the interaction of the fuel oil with an atomizing fluid, such as air, steam or a mixture thereof. Mechanical atomizers usually rely on pressure on the liquid fuel, which forces such through a restricted orifice, to disrupt the fuel liquid into droplets.

Dual fluid atomization can usually be accomplished in one of two ways. According to the internal mixing method, the two fluids are both simultaneously impacted against a suitable plate, such as a back plate of a mixing chamber, from which impact they then fill that mixing chamber with the intimate mixture of both fluids. The mixture is then ejected through a nozzle, suitably located in the atomizer, spray plate, into the combustion zone of a furnace.

According to another method, the external mixing method, liquid fuel and gas are each independently fed into a common chamber, or several chambers, one for each exit aperture, at intersecting angles to intersperse the two fluids into a mixture. The mixture is then ejected from a suitable nozzle, which nozzle may be an integral part of the chamber housing.

Mechanical atomization may be of the type in which all of the fuel oil, which is to be fed to an atomizing nozzle, is ejected into the combustion zone of a furnace, where it meets with combustion supporting air. The amount of oil fed to the furnace is controlled by controlling the amount of oil fed to the atomizer. This is referred to as a once through, or Simplex, atomization. In the so called return flow type of atomization, the oil flow to the atomizer is maintained at a constant level, but only a portion of the oil is fed into the furnace with the rest of it being recycled to the fuel oil reservoir. In any of these cases, in addition to the aerodynamics of the burner, the creation of droplets containing the fuel oil, and the physical properties of these droplets are major determinants with respect to the quality of the fuel oil combustion in the furnace.

BROAD DESCRIPTION OF THIS INVENTION

It is therefore an object of this invention to provide an improved atomizer especially designed to improve the overall efficiency of atomization of a liquid, particularly fuel oil, and therefore to improve the overall efficiency of mixing the atomized liquid and a gas, for example steam, in order to improve the overall efficiency of the combustion of fuel oil in a furnace.

It is another object of this invention to provide a novel atomizer design, as well as a process of atomizing a liquid using this novel designed atomizer.

It is a further object of this invention to provide an improved process of combusting fuel oil, based on an improved atomizer design, in which the size and mass distribution of the less desirable emitted carbonaceous particles are limited thereby enhancing the burn-out of these particles.

It is a still further object of this invention to provide an improved atomizer design which will produce a spray of atomized particles having characteristics that promote mixing thereof with combustion air, particularly in burners with low primary air flows, or with recirculation flows at the axis of the burner.

It is a still further object of this invention to produce desirable fuel/air mixture ratios in a zone near the burner of an oil-fired furnace, and to minimize any excess oxygen requirements of the system, thereby substantially reducing the NOX emissions produced by the system.

It is a still further object of this invention to provide a novel atomizer design which is capable of producing a segmented stream of atomized liquid having disproportionate stoichiometry in the various spray segments.

Other and additional objects of this invention will become apparent from a consideration of this entire specification, including the drawing hereof and the claims appended hereto.

In accord with and fulfilling these objects, one aspect of this invention comprises an novel atomizer design. According to this design, the atomizer comprises:

a main body, which defines a generally centrally located, circumferentially defined open space;

a first conduit means, adapted to communicate through said main body with said open space, to carry fuel oil through said main body and into said open space; and a second conduit means, adapted to communicate through said main body with said open space and to carry atomizing gas through said main body into said open space.

The main body of the atomizer of this invention comprises:

one or more side walls, which may be straight or curved as desired and required;

a back plate member in closing contact with the side wall(s) defining one end of the main body, and a first end to the open space; and a front member, which defines a second end to the open space, at the end thereof opposite to the back plate member. The side wall(s), the back plate member, and the front member define and confine an internal mixing chamber. The front member has a generally conical, preferably a right circular frustroconical, slot therein which may be axially aligned with the general center of the mixing chamber. Preferably, the mixing chamber is substantially cylindrical, and there is substantially exact alignment of the axes of this cylinder and the conical slot.

This conical slot is in the front portion of the atomizer assembly, suitably either wholly within the front member, or partially within the front member and partially within or defined by the side wall(s) of the main body. Preferably the conical slot is at the juncture between the front member and the side wall(s) of the main body of the atomizer of this invention. This slot serves as an exit means and thereby communicates between the internal mixing chamber and an area, for example a furnace combustion chamber, outside the atomizer into which the atomized liquid, for example the fuel, is intended to be sprayed. Where required, means may be provided, suitably disposed through the mixing chamber, to operatively support the front member by at least the back plate member of this apparatus.

In a preferred aspect of this invention, the conical spraying nozzle is segmented. That is, the free passage of atomized material through the cone of the nozzle is interrupted one or more times, by piers suitably disposed around its periphery. In addition to their functional use in determining the geometry of the atomized fuel sprayed from the nozzle, these piers may also form the support structure for joining the inner surface of the cone to the outer surface thereof to form the nozzle (channel). In this preferred embodiment of this invention, the conical spraying nozzle may be formed between the front member and the side wall(s) of the main body, and the front member may be supportingly joined to the side walls at one or more places around the periphery of the conical slot. These joining members, or piers, may extend only part way along the length of the nozzle. That is they may extend from the front of the conical nozzle in contact with the furnace combustion chamber part way back along the length of the conical channel. In the alternative, these joining members can be located toward the rear end of the conical channel starting from the mixing chamber end thereof and extending only part way along the length of the conical channel. If desired, it is within spirit the and scope of this invention to provide multiple piers along the length of the conical slot. It is preferred, however, to have these pier members extend along the complete length of the conical slot from the point where the mixing chamber communicates with the slot, to the place where the slot communicates with the space into which the atomized fluid will be sprayed. Preferably, there are a multiplicity of these joining members, or pier assemblies, spaced about the periphery of the conical slot. The preferred configuration is symmetrical, but the pier distribution may be asymmetric if desired.

The novel atomizer described here is adapted to be operatively associated with peripheral apparatus, such as:

means to supply the atomizing gas, means to supply the liquid to be atomized, such as fuel oil, means to pressurize any or all of: the atomizing gas, the liquid to be atomized, and atomized liquid, receptacle means, such as the combustion chamber of a furnace means, into which the mixture of the atomized liquid and the atomizing gas, is sprayed, and where the receptacle means is a furnace combustion chamber, means to introduce all or additional combustion supporting gas, such as air, if needed, into the chamber, or, where the receptacle means is a humidifying chamber, means to introduce into the chamber the gas in need of humidification, suitably air.

BRIEF DESCRIPTION OF THE DRAWING

This invention will be better understood with reference to the drawing, which is illustrative thereof, and in which:

FIG. 2 is a plan view of one of a preferred nozzle design which is adapted to use in this invention;

FIG. 3 is a view of the preferred nozzle shown in FIG. 2 which has been sectioned along the line 3—3. This FIG. 3 is a perspective view which looks generally in the direction of the arrows;

FIG. 4 is a side view of the preferred nozzle design shown in FIG. 2, sectioned along the line 4—4 looking in the direction of the arrows;

FIGS. 5–7 are a typical series of curves depicting various relationships between the design of the atomizer of this invention and the properties of the spray provided thereby. These curves are provided as examples of the operation of this invention. Each specific operation, with its own unique parameters of operation will produce its own unique set of similar curves. In each figure, the specific relationship being depicted is set forth.

DETAILED DESCRIPTION OF THIS INVENTION on the geometry of the spray which emerges from the nozzle. The number and the spacing of these exit point spacers has a dramatic effect on the geometry of the atomized spray, on the characteristics of combustion of that spray, and on the particulate, and NOX emissions produced.

It has been reported elsewhere, see U.S. Pat. No. 4,790, 480, that disrupting a conical spray, from the exit of a nozzle, after it leaves the nozzle and as it is being fed into a combustion chamber, causes substantial improvement in the combustion characteristics of the atomized fuel in the combustion chamber. When the conical stream is broken up after it leaves the nozzle, there is substantially improved burn-out accomplished, and the combustion of the fuel oil is substantially more complete thereby reducing the potential adverse effects of the off gas generated by the combustion.

In that patent, there is described means disposed outside of the nozzle that breaks up the atomized stream after it leaves the nozzle. This is to be distinguished from the structure of the instant invention where the stream comprising fuel passing through conical nozzle passageway is broken up within the nozzle, that is before it exits the nozzle and becomes a spray. The spray which is produced according to the practice of this invention is a segmented, substantially conical spray, with non-uniform segments of spray about the entire periphery thereof. These segments may have different bulk densities and/or compositions. That is, because of the interposition of the support-spacer pier means in the conical nozzle passageway, the spray which comes out of the nozzle of this invention has a non-uniform bulk density, composition and pattern as a function of the location of the support-spacers. Thus, alternating fuel-rich and air-rich segments can be created around the periphery of the spray cone. By constricting this spray inside the nozzle means, the adverse consequences of externally disrupting the spray, which is shown in the '480 patent, are avoided.

The NOX and particulate emissions have been found to be substantially reduced by the practice of this invention and particularly by the use of the special nozzle design which is described herein. During tests of the novel nozzle design of this invention, using heavy fuel oil as the atomized feed, it was found that the excess oxygen requirement, that is the amount of excess oxygen which is required to insure maximum combustion of the fuel oil within the operating parameters of the system, was substantially decreased. This decrease in the excess oxygen requirement and the alternating fuel-rich and air-rich spatial distribution of the segmented spray causes the NOX emissions to be substantially decreased. Increased boiler efficiency was also obtained with the decrease in the excess oxygen requirement.

The mixing chamber and the nozzle may be made of any materials which are convenient and which will withstand the rigors of the fluids being contacted therewith and the temperatures and the pressures at which these fluids are contacted therewith. Thus, if the fluids are corrosive, the materials of construction should be able to withstand corrosion by these fluids for at least an acceptable service life. Metals and plastics are the usual materials of construction, with steel being especially desirable in most cases. It is considered to be within the scope of this invention to provide suitable coatings on the surfaces of the enclosure for the mixing chamber, the spraying nozzle and the other elements of this apparatus. Suitably, these coatings may render the underlying construction materials resistant to deterioration by contact with or passage of the contained fluids. For typical oil fired furnace-boiler applications, the atomizer assembly (the main body, nozzle assembly, passageways, and the support shaft if employed) can preferably be constructed of tool steel, such as H-13 Rc 53-56 tool steel, or for more corrosive environments and application, AISI 440C pre-heat-treated steel.

With the atomizer design according to this invention specifically adapted for use in atomizing heavy fuel oil with atomizing steam, it has been found that, for a given atomized fuel to atomizing fluid pressure differential, the quality of the spray produced by the practice of this invention will not vary to any appreciable degree as a function of the size of the conical nozzle passageway. It has been found that when the fuel oil to atomizing steam pressure differential was held substantially constant at about 10 psig., and the gap in the conical nozzle was varied from about 0.078 inch to 0.100 inch, the SMD (Sauter Mean Diameter) varied only about 4 μm from about 66 μm to about 70 μm. However, under these conditions, as the gap setting was increased from 0.078 inch to 0.100 inch, the exit velocity of the fluid decreased about 25%. It was also found that the fluid pressures which were required to maintain equivalent fuel flow decreased proportionately to the increase in gap, because the fluids passing through the gap met less resistance to flow at the wider atomizer exit.

It was found that the adjustment of the exit gap width allowed the NOX emissions to be reduced, by providing lower excess oxygen requirements for a wide range of fuel to atomizing fluid pressure differentials. Thus, variations in fluid velocities, small changes in effective spray angle, and the relative penetration of the fuel spray into and about the internal recirculation zone (IRZ) in the combustion chamber, which are associated with variations in the gap size, appear to have a significant impact on the excess oxygen requirement, and the fuel/air mixing rate that is required to support substantially complete fuel combustion with a minimum of NOX emissions. The internal recirculation zone (IRZ) is a zone formed downstream of the atomizer exit at sufficiently high levels of combustion air swirl in which combustion products are caused to be circulated back towards the fuel spray exiting the atomizer nozzle.

It has been pointed out above that the front plate means can suitably be supported by means of a center body 26 extending from the back plate means to the front plate. It has also been pointed out that this is not an essential configuration of the apparatus of this invention, but that the front plate means and nozzle means could be assembled in a different manner. In initial prototype evaluation, it has been found that it is preferred to utilize a center body support means which is threaded at the nozzle-front plate means end. In this manner, the gap in the conical nozzle passageway can be readily adjusted by simply turning one surface thereof relative to the other about this threading.

Designs of nozzle means according to this invention can be assembled so that the spray is of only one or more portions of a cone. Thus, a full conical spray may be used, a partial conical spray may be used, or multiple spray segments, which are each portions of a cone, may be used. As an example of such multiple partial conical areas, a segmented V-jet with two (2) conical exit slots has also demonstrated reductions in NOX emissions of up to about 40% by being able to minimize the excess oxygen requirements of the system, by being able to adjust the stoichiometry of air and fuel about the conical spray, and by producing desirable fuel/air ratios in the zone near the burner. Further, such segmented nozzle sprays have encouraged more thorough combustion and have therefore produced off gases of substantially lower opacity, which are therefore more environmentally acceptable.

In practicing this invention, it has been found that the angle at which the atomizing gas and the fluid being atomized, respectively, enter the mixing chamber of the apparatus of this invention is an important consideration in the design of this apparatus from the perspective of efficiency of operation. It has been found to be most preferred for each of the atomizing gas and the fluid being atomized to impinge upon the back plate means of the mixing chamber and to impact thereon at about a right angle. Of course, this is not an absolute limitation. The angle may vary from 90° to some extent, for example from about 75° to 105°, without substantially jeopardizing the advantageous results which are achieved by the practice of this invention. This provides for dynamic mixing of the atomizing gas and the fluid to be atomized, improves atomization, and reduces the consumption of atomizing gas in the operation.

The transport conduits which bring the atomizing gas and the atomized fluid into the mixing chamber may be located in a radial or a tangential manner with respect to the chamber. Where tangential introduction is employed, the two fluids can be introduced in co- or counter-current rotational direction with respect to the external air flow established by the burner flame stabilizer and registers. By introducing angular momentum to the fluids being introduced into the mixing chamber, it is possible to influence some of the combustion characteristics of the atomized fuel. For example, co-rotating the fluids will decrease the fluid volume flux in the near portion of the burner zone, and thereby reduce fuel rich areas therein. Such a design will increase the spray quality uniformity, and it will also positively effect fluid velocities and penetration of the atomized mixture into the near burner zone.

In designing the mixing chamber and conical nozzle assembly of this invention, and in establishing the operating conditions for a process using this apparatus, it is possible to introduce variations in size and shape which will affect the residence time in the mixing chamber. Thus it is possible to optimize this residence time. It is preferred that the mixing chamber be directly upstream of the conical nozzle, and that the combustion chamber be immediately downstream of the conical nozzle. By assembling these elements in very close proximity, it is possible to minimize the time lag between atomization in the mixing chamber and combustion in the combustion chamber. The closer these elements are to each other, the less is the likelihood that the atomized condition of the fuel will break down prior to combustion thereof. The V-jet atomizer of this invention provides substantially constant spray quality into the combustion zone. The droplet size and atomizing mass ratios (steam to oil) are substantially constant over a wide range of fluid input pressures for a given atomizing gas to fluid pressure differential in the range of between about 10 and 30 psig. In a V-jet operation according to this invention at a pressure differential of about 10 psig, a typical operating system can operate at mass ratios of only about 10%. Because operating in the manner of this invention with the apparatus of this invention still provides excellent atomization even at very low input pressures and flows, this condition allows the operator to be able to turn down the furnace/boiler, that is to reduce boiler load, without having to shut off burners and thereby remove burners from service.

The following example is illustrative of the practice of this invention. It is not to be considered as being in any way limiting on the scope of the invention or of the claims appended hereto. In this example, parts and percentages are by weight unless specified to be on some other basis.

Example

Figure 1:
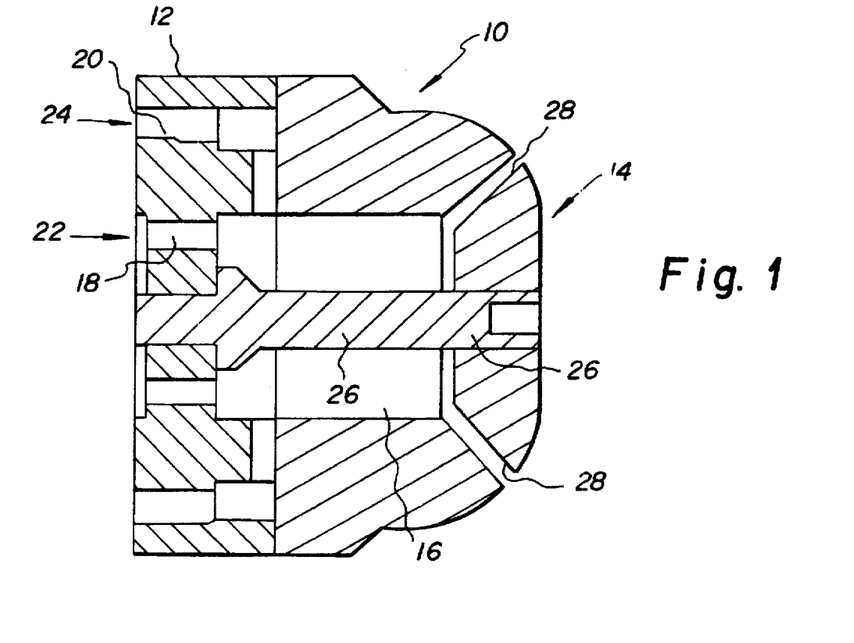
FIG. 1 is a side sectional view of an atomizer designed according to one preferred aspect of this invention, which is provided with mean for adjustment of the exit channel width.
Figures 2, 3, 4:
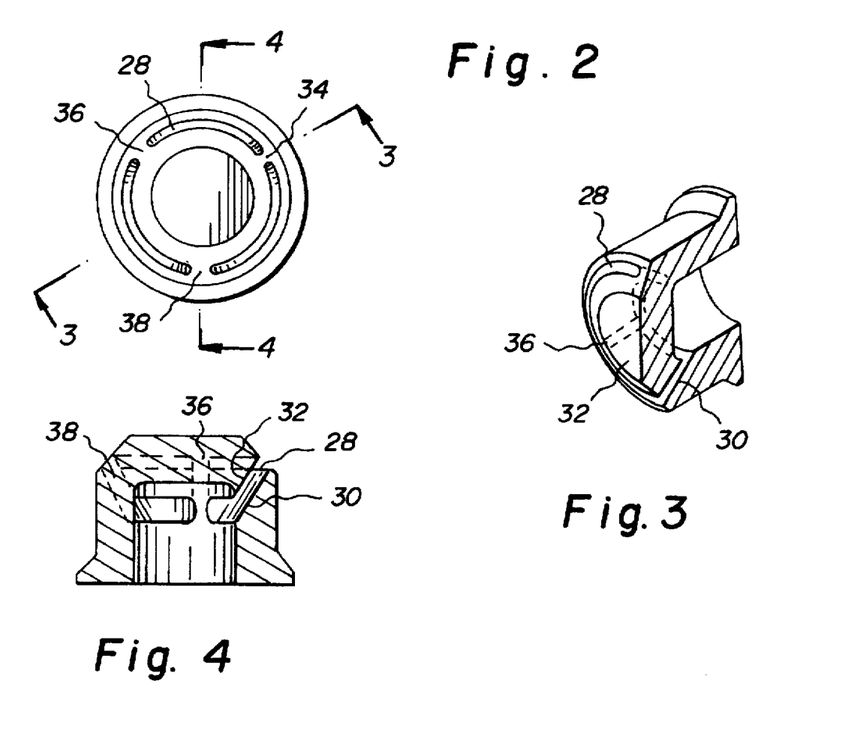
Figure 5:
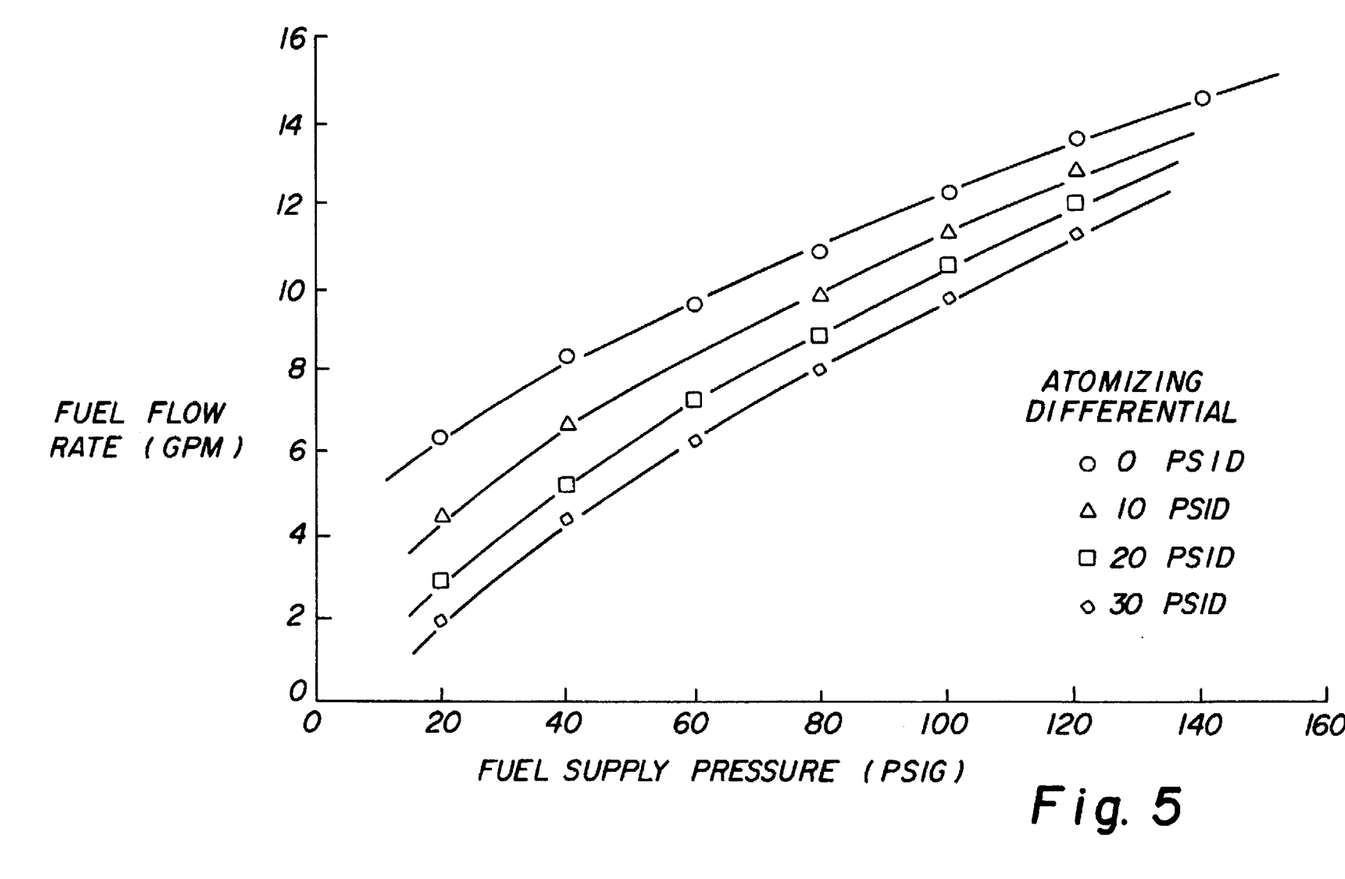
FIG. 5 shows the relationship between Fuel Flow and Supply Pressure.
Figure 6:
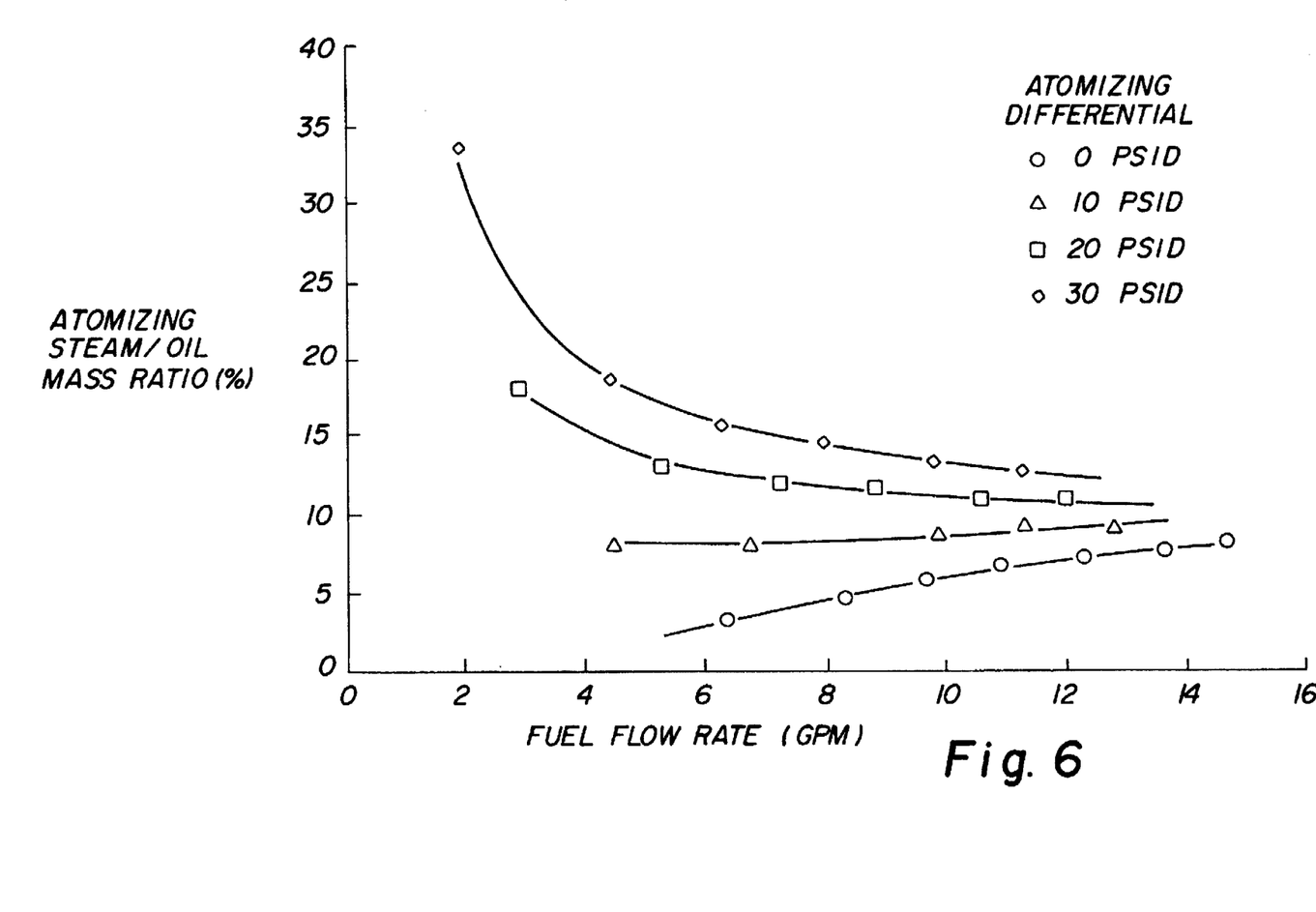
FIG. 6 shows the relationship between Atomizing Mass Ratio and Fuel Flow.
Figure 7:
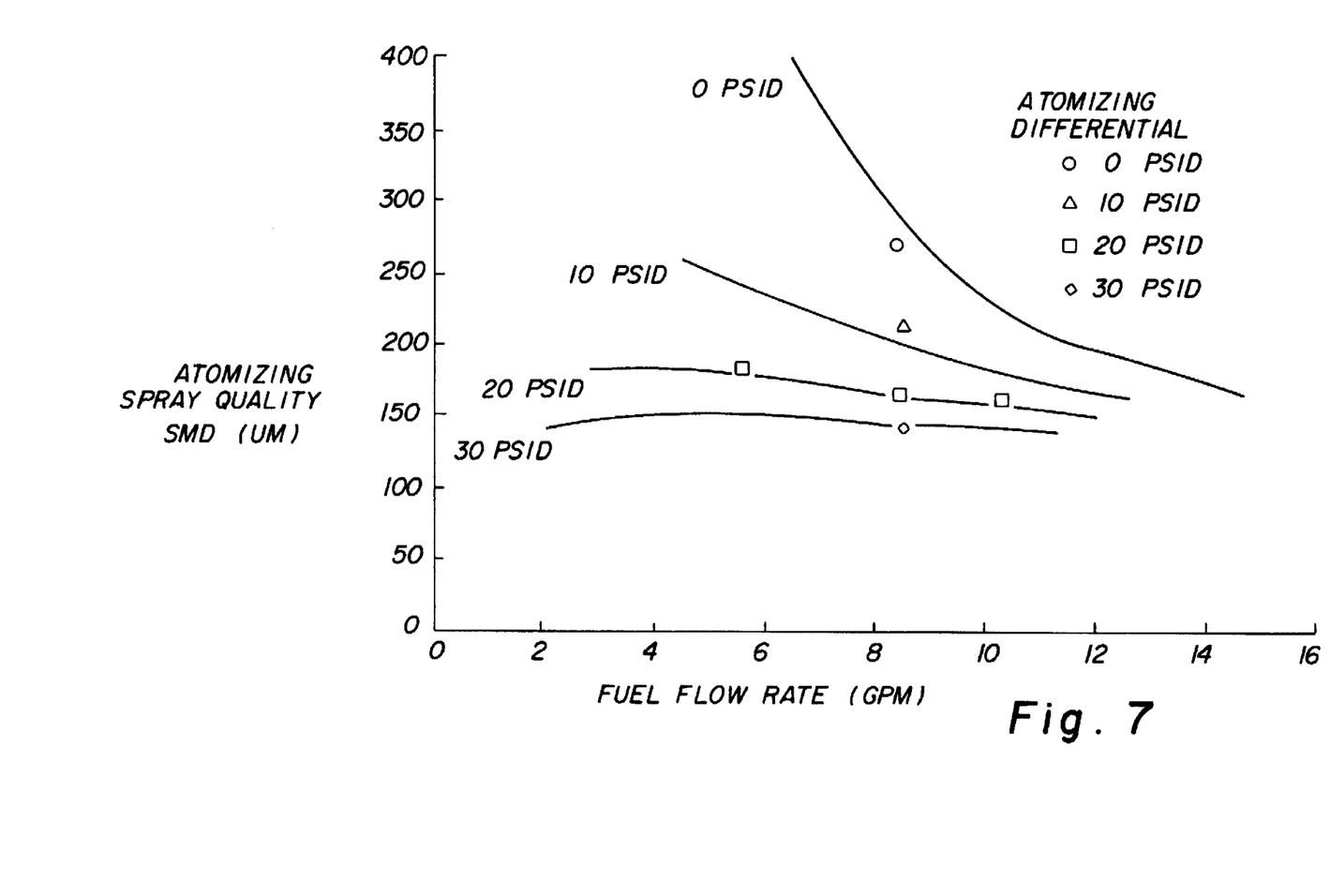
FIG. 7 shows the relationship between Atomizing Spray Quality and Fuel Flow.

An internal mix V-jet atomizer design was tested using a heavy oil to feed the burners of a 150 klbs/hr utility package boiler. The conventionally boiler fired low sulfur (<0.3%) No. 6 fuel oil and used steam as the atomizing fluid. The prototype atomizer tested had an adjustable gap setting feature and an effective spray angle of between 70° and 75°. Reference is made to FIG. 1 of the attached drawings for design details.

The conical spray nozzle-atomizer was tested at three exit gap settings 0.078", 0.089" and 0.100". As the gap setting was increased from 0.078" to 0.100", the fluid exit velocities were significantly decreased, by about 25%. The fluid pressures required to maintain a particular fuel flow were also reduced as the exit gap width increased. At each of the gap settings, a range of operating parameters was evaluated, including: 1) fuel oil to atomizing steam pressure differential, 2) fuel flow, 3) excess $O_2$ requirement levels, 4) burner register swirl, 5) various flame stabilizer designs, and 6) oil gun and stabilizer axial position.

For each of the curved vane swirlers and V-Jet exit gap settings (and combinations thereof) examined, it was noted that the NOX emissions were significantly decreased as the fuel oil to steam pressure differential ($\Delta P$) was increased from 0 to 20 psi. In most cases, as the $\Delta P$ was increased, and the spray quality thereby improved (reduced droplet sizes), less excess $O_2$ was required to maintain low opacity levels. This reduction in the required excess $O_2$ level resulted in a significant reduction in NOX emissions. This effect was particularly apparent under moderate register swirl conditions.

For a given fuel oil to atomizing steam pressure differential, the spray quality (as calculated) did not vary significantly as a function of gap settings. However, the mid-range gap setting of 0.089", provided lower NOX emissions and lower excess $O_2$ requirements for fuel oil to atomizing steam pressure differentials of 0 and 10 psi. Thus, variations in the fluid exit velocities (and perhaps slight variations in the effective spray angle), and variations in the relative penetration of the fuel spray into and about the IRZ, associated with the variation of the gap size, had significant impacts on the level of excess $O_2$ required, the local fuel/air ratios, the fuel/air mixing rates, and the resulting NOX emissions.

A segmented V-jet design was also evaluated during the above test program. This design, which segmented the fuel spray into two portions of a complete cone (highly fuel rich areas), was shown to produce the lowest NOX emissions of all atomizers tested during the field demonstration. That is, lower than all standard, Low-NOX, and other novel atomizer designs. A NOX reduction of approximately 43% (as compared to the original boiler hardware) was documented, with no observed increase in particulate matter emissions.

An additional segmented V-jet with two (2) exit slots, was tested on a face-fired boiler with eight (8) Peabody APR 21 burners. Again, the use of this atomizer design resulted in NOX emission reductions of about 40% from the baseline conditions, despite significant differences in burner configuration from the previous example.

What is claimed is:

1. A method of combusting liquid fuel with reduced discharge of nitrogen oxides which comprises:
    atomizing liquid fuel with an atomizing gas to form a mixture of atomized fuel droplets in said atomizing gas;
    forcing said mixture of said atomized liquid fuel droplets in said atomizing gas through a circumferential substantially annular area containing a plurality of diverging frustroconical circumferentially elongated passageways, each passageway separated from an adjacent passageway by a pier, wherein the piers occupy a minor portion of the circumferential annular area and the passageways occupy a major portion of the circumferential annular area;

ejecting streams of the mixture from the passageways to form a non-uniform axially diverging spray comprising a multiplicity of fuel-rich regions, corresponding to the locations of said passageways, interspersed with a multiplicity of fuel-lean regions, corresponding to the locations of said piers, so that the fuel-rich and fuel-lean regions, taken together, comprise a substantially conical region which has non-uniform bulk density and non-uniform composition about its periphery; and contacting the non-uniform axially diverging spray of the mixture of fuel and atomizing gas with at least a sufficient amount of oxidizing gas to combust at least a substantial portion of the fuel under conditions conducive to the combustion of the fuel with oxygen in the oxidizing gas.

2. Method of claim 1, wherein the liquid fuel is atomized by impacting it with the atomizing gas.

3. Method of claim 1, wherein the oxidizing gas is air.

4. Process as claimed in claim 3, including the step of controlling the size of the atomized fuel droplets in the atomizing gas ejected from the elongated passageways, and the ratio of fuel to air used in the combustion of the atomized fuel, to both maximize the combustion of carbon and minimize the formation of NOx.

5. Method of claim 3, wherein the liquid fuel is fuel oil.

6. Method of claim 5, wherein the fuel oil is heavy fuel oil, and the non-uniformity of the axially diverging spray, together with the ratio of air to fuel oil, is sufficient to minimize the production of NOx.

7. Method of claim 1, wherein 2, 3 or 4 piers separate the plurality of elongated passageways.

8. Method of claim 7, wherein the piers are symmetrically located.

9. In a dual fluid atomizer comprising:

an enclosed mixing chamber;

means for introducing a liquid fuel to be atomized and an atomizing gas into said mixing chamber and for atomizing the fuel in the gas to form a mixture of droplets of the atomized fuel in the gas; and a nozzle having a longitudinal axis and at least one opening communicating the enclosed mixing chamber with space outside of the mixing chamber to expel the mixture of liquid droplets in the atomizing gas from the nozzle into the space as a spray;

the improvement which comprises the said at least one opening being a plurality of diverging frustroconical circumferentially elongated passageways located in a circumferential substantially annular area, with each passageway being separated from an adjacent passageway by a pier located in the annular area, wherein the piers occupy a minor proportion of the annular area and the passageways occupy a major proportion of the annular area, the size and location of the piers and the passageways cooperating to cause the mixture when ejected from the passageways to form an axially diverging spray composed of a multiplicity of fuel-rich regions, corresponding to the location of the passageways, interspersed with a multiplicity of fuel-lean regions, corresponding to the location of the piers, which fuel-rich and fuel-lean regions taken together comprise a substantially conical spray having a non-uniform bulk density and a non-uniform composition about its periphery to permit the spray to be combusted in the presence of an oxidizing gas to produce a combusted gas having a low level of nitrogen oxides.

10. Atomizer of claim 9, wherein 2, 3 or 4 piers are located in the annular area.

11. Atomizer of claim 10, wherein the piers are symmetrically located.

12. Atomizer of claim 9, wherein the atomizing means atomize the fuel in the gas by impacting the liquid fuel with the atomizing gas.

13. Atomizer of claim 12, wherein the atomizing means impacts the liquid fuel with atomizing air.

14. Atomizer of claim 13, wherein the atomizing means atomizes fuel oil in the atomizing air.

15. Atomizer of claim 12, Wherein the plurality of passageways form a vertex angle of about 50° to 100°.

16. Atomizer of claim 15, wherein the vertex angle is about 90°.

17. Atomizer of claim 12, wherein the passageways have a width of about 1/32 to 1/2 inch.

18. In a dual fluid atomizer comprising:

an enclosed mixing chamber;

means for introducing a liquid fuel to be atomized and an atomizing gas into said mixing chamber and for atomizing the fuel in the gas to form a mixture of droplets of the atomized fuel in the gas; and a nozzle having a longitudinal axis and at least one opening communicating the enclosed mixing chamber with space outside of the mixing chamber to expel the mixture of liquid droplets in the atomizing gas from the nozzle into the space as a spray, the improvement which comprises the said at least one opening being a spray means for forming an axially diverging spray composed of a multiplicity of fuel-rich regions interspersed with a multiplicity of fuel-lean regions, which fuel-rich and fuel-lean regions taken together comprise a substantially conical spray having a non-uniform bulk density and non-uniform composition about its periphery, so that the spray can be combusted in the presence of an oxidizing gas to produce combusted gas having a low level of nitrogen oxides, said spray means comprising a circumferential substantially annular area of the nozzle, a plurality of diverging frustroconical circumferentially elongated passageways located in said annular area, with each passageway being separated from an adjacent passageway by a pier located in the annular area, wherein the piers occupy a minor proportion of the annular area and the passageways occupy a major proportion of the annular area, the fuel-rich regions of the axially diverging spray corresponding to the locations of the passageways, and the fuel-lean regions corresponding to the locations of the piers.

* * * * *